United States Patent [19]

Maeba et al.

[11] Patent Number: 4,755,923
[45] Date of Patent: Jul. 5, 1988

[54] REGULATED HIGH-VOLTAGE POWER SUPPLY

[75] Inventors: Yukio Maeba; Shigeki Kasai; Kiyoteru Igashira, all of Nagaokakyo, Japan

[73] Assignee: Fukami Patent Office, Japan

[21] Appl. No.: 29,640

[22] Filed: Mar. 24, 1987

[30] Foreign Application Priority Data

Mar. 31, 1986 [JP] Japan ................... 61-74593

[51] Int. Cl.$^4$ ................ H02H 7/122; H02M 3/337
[52] U.S. Cl. ........................... 363/56; 363/23
[58] Field of Search ............. 363/22, 23, 24, 25, 363/26, 56

[56] References Cited

FOREIGN PATENT DOCUMENTS

| 0022583 | 3/1981 | Japan | 363/56 |
| 132776 | 7/1984 | Japan . | |
| 450297 | 3/1975 | U.S.S.R. | 363/56 |

Primary Examiner—Patrick R. Salce
Assistant Examiner—Judson H. Jones
Attorney, Agent, or Firm—Ostrolenk, Faber, Gerb & Soffen

[57] ABSTRACT

An inventive regulated high-voltage power supply circuit comprises a push-pull oscillation circuit (30) including two transistors (TR4, TR5), a control circuit (20) for controlling voltage to be supplied to the oscillation circuit, a short detecting circuit (50) for detecting shorting in the secondary side of a high-voltage transformer thereby to attenuate output voltage from the control circuit and a time-constant circuit (60) for maintaining an attenuated state of the output voltage of the control circuit caused by the short detecting circuit after releasing of the shorting for a prescribed period of time. Since the osccillation circuit is of the push-pull type, the same can oscillate over the entire periods of positive and negative halfwaves of the AC waveform, thereby to increase outputted power. When shorting of the secondary side is detected, the output voltage of the control circuit is attenuated, and the attenuated state of the output voltage of the control circuit is maintained by the time-constant circuit even if the shorting detection is released, thereby to reduce the overcurrent per unit time.

4 Claims, 2 Drawing Sheets

REGULATED HIGH-VOLTAGE POWER SUPPLY

BACKGROUND OF THE INVENTION

1. Field of the Invention

The present invention relates to a regulated high-voltage power supply. More specifically, it relates to a regulated high-voltage power supply which comprises a tuned-collector type oscillation circuit to obtain stabilized high-voltage output by controlling the base currents for oscillation transistors of the oscillation circuit.

2. Description of the Prior Art

FIG. 1 is an electric circuit diagram showing a regulated high-voltage power supply proposed in Japanese Patent Application No. 6182/1983 (Japanese Patent Laying-Open Gazette No. 132776/1984 published on July 30, 1984).

Referring to FIG. 1, the high-voltage power supply 10 comprises a tuned-collector/grounded-emitter type oscillation circuit 3 including a regenerative capacitor C2, an oscillation transistor TR4 and the like and a control circuit 2 for controlling the base current for the oscillation transistor TR4. The high-voltage power supply 10 further comprises a resistance circuit 4 for supplying the base current to the oscillation transistor TR4 in response to the output from the control circuit 2 and a protection circuit 5 having a protective transistor TR3 which partially receives the output from the resistance circuit 4 for attenuating the output of the control circuit 2 when the output is shorted in the area of a load RL.

The resistance circuit 4 includes a first resistance circuit part 41 having a high resistance value and a second resistance circuit part 42 including a zener diode ZD. The first resistance circuit part 41 is formed by a plurality of series-connected resistors R3 and R4, the junction P2 between which is connected to the base of the protective transistor TR3 of the protection circuit 5. A negative feedback control circuit 6 is connected to the protective transistor TR3. This negative feedback control circuit 6 is provided for negative feedback of the output from a detecting resistor R9 which is connected to the high-voltage output area as shown by arrows A, thereby to control the operation of the control circuit 2. An output circuit 7 is connected to a high-voltage transformer T. This output circuit 7 is adapted to supply high-voltage output to the load RL in response to the output from the oscillation circuit 3. An input terminal $V_{in}$ receives a current from a DC power supply and an output terminal $V_{out}$ generates high-voltage output. As hereinabove described, the load RL is connected to the output terminal $V_{out}$.

The oscillation circuit 3 further includes an oscillation stabilizing resistor R7, a positive feedback winding L3, a tuning capacitor C3 and a primary (low-voltage) winding L1 of the high-voltage transformer T. The first resistance circuit part 41 of the resistance circuit 4 is not mainly directed to supply the base current to the oscillation transistor TR4, but is adapted to form a short detecting circuit for detecting whether or not the high-voltage output is shorted. Therefore, the resistors R3 and R4 are set at high resistance values. The second resistance circuit part 42 of the resistance circuit 4 forms a main base-current network for mainly supplying the said base current, and the resistor R5 thereof is set at a low resistance value.

The negative feedback control circuit 6 comprises a comparison amplifier AMP a capacitor C1, resistor R1 and a reference power supply E1. A negative-phase input terminal (−) of the comparison amplifier AMP receives the output from the detecting resistor R9 as shown by arrows A while a positive-phase input terminal (+) thereof receives the output from the reference power supply E1. The output circuit 7 includes a secondary (high-voltage) winding L2 of the high-voltage transformer T, a rectifier diode D1, a smoothing capacitor C4 and a spark discharge preventing resistor R8. In addition, the regulated high-voltage power supply circuit 10 includes a delay capacitor C5 which is provided between the junction P2 of the resistors R3 and R4 forming the first resistance circuit part 41 and a grounded point P4 for delaying the rise time of operation voltage Vb of the protective transistor TR3 at the junction P2 with respect to the rise time of output voltage Va from the control circuit 2.

Description is now made on the operation of the regulated high-voltage power supply circuit 10 as shown in FIG. 1. When the power supply circuit 10 is activated, the negative-phase input terminal (−) of the comparison amplifier AMP in the negative feedback control circuit 6 is at a low input level. Therefore, the output of the negative feedback control circuit 6 rises toward a high level, whereby the output voltage Va at an output point P1 of the control circuit 2 is increased. The rise speed of the operation voltage Vb at the junction P2 is slower than that of the output voltage Va, through the function of the aforementioned delay capacitor C5.

Therefore, the output voltage Va rises to a level for making the zener diode ZD conduct before the operation voltage Vb at the junction P2 is increased to make the protective transistor TR3 conduct. Consequently, the base of the oscillation transistor TR4 is supplied with the base current through the zener diode ZD and the resistor R5, whereby the oscillation circuit 3 rapidly enters an oscillating state. Thus, when the oscillation circuit 3 enters a normal oscillating state, the oscillation transistor TR4 is continuously supplied with the base current since the output voltage Va at the output point P1 of the control circuit 2 is set to be higher than the zener voltage of the zener diode ZD. Further, the operation voltage Vb at the junction P2 is set to be lower than the driving voltage for the protective transistor TR3, so that the protective transistor TR3 is not operated.

When the high-voltage output is shorted, the oscillation is so attenuated that voltage Vc at the junction P3 between the regenerative capacitor C2 and the oscillation stabilizing resistor R7 is increased, whereby the operation voltage Vb at the junction P2 is also increased. As the result, the protective transistor TR3 conducts to decrease the output voltage Va of the control circuit 2. The decreased output voltage Va is set to be lower than the zener voltage Vz of the zener diode ZD. Therefore, the zener diode ZD enters a non-conducting state and substantially no base current is supplied to the oscillation transistor TR4, whereby the oscillation circuit 3 stops the oscillation. In addition, although a small base current still flows through the first resistance circuit part 41 to the oscillation transistor TR4, the oscillation will not be developed because of the shorting of the high-voltage output. Thus, the high-voltage power supply 10 is protected against shorting of the high-voltage output.

When the shorting of the high-voltage output is released, the oscillation circuit 3 starts a small amplitude oscillation due to the small base current flowing through the first resistance circuit part 41, whereby the voltage Vc of the regenerative capacitor C2 starts lowering and the protective transistor TR3 enters a nonconducting state. Since the rise speed of the operation voltage Vb at the junction P2 is slower than that of the output voltage Va of the control circuit 2 as hereinabove described, the protective transistor TR3 is not operated thereafter and the zener diode ZD is made to conduct. Consequently, the oscillation transistor TR4 is supplied with the required base current, whereby the oscillation circuit 3 smoothly re-starts oscillation, so that the high-voltage power supply circuit 10 may be restored to a state for supplying prescribed high-voltage output.

However, the conventional high-voltage power supply circuit 10 as shown in FIG. 1 has the following disadvantage: The storage charge in the delay capacitor C5 is so small in the conducting state of the protective transistor TR3 that the charge is rapidly discharged, whereby the protective transistor TR3 enters a nonconducting state from a conducting state in a short period of time. Therefore, when an overcurrent state caused by shorting of the high-voltage output is released, the oscillation circuit 3 is rapidly shifted to a normal oscillating state from a low-level oscillating state so that the high-voltage power supply circuit 10 is immediately restored to the high-voltage output supplying state, to again cause an overcurrent state by shorting of the high-voltage output. In other words, the overcurrent per unit time is increased, to cause danger of disconnection or fire.

When the high-voltage power supply circuit 10 is applied to a copying machine or the like, the aforementioned disadvantage leads to the following serious problem: In the copying machine, a corona discharge caused by the high-voltage output from the output circuit 7 is employed for copying operations. Such corona discharge changes into spark discharge when copying papers are jammed so as to cause shorting in a load area. Such spark discharge causes a state similar to shorting of the load area.

Although this shorting is immediately released by stoppage of oscillation based on conduction of the protective transistor TR3, the protective transistor TR3 is immediately restored to a non-conducting state and the oscillation circuit 3 re-starts oscillation since the storage charge in the delay capacitor C5 is small, whereby spark discharge again takes place. Such spark discharge is intermittently caused when the papers are continuously jammed, whereby discharge energy of the spark discharge per unit time is increased to cause paper burning, leading to danger of fire.

Further, peripheral circuits around the high-voltage power supply circuit 10 may be damaged depending on arrangement thereof. In the conventional high-voltage power supply circuit 10 as shown in FIG. 1, on the other hand, the oscillation circuit 3 is merely provided with a single oscillation circuit TR4, which conducts only for a halfwave period of the AC waveform induced by the high-voltage transformer T, whereby the output voltage of the output circuit 7 is made small. The oscillation circuit 3 is provided with the single transistor in order to prevent the aforementioned danger of fire, whereas fire cannot be completely prevented and the copying function based on normal corona discharge itself is lowered.

SUMMARY OF THE INVENTION

Accordingly, a principal object of the present invention is to provide a regulated high-voltage power supply circuit which can increase the output of an output circuit while reliably preventing short-time repetition of a shorted state of a load side, which may cause fire.

Briefly stated, a primary winding, a first positive feedback winding and a second positive feedback winding reverse to the first positive feedback winding are coupled to a high-voltage transformer so that an end of a first switching element is connected to the primary winding and a control terminal thereof is connected to the first positive feedback winding while an end of a second switching element is connected to the primary winding and a control terminal thereof is connected to the second positive feedback winding to form a push-pull oscillation circuit, which is controlled by a control circuit. A short detecting circuit is connected to the first and second positive feedback windings to detect shorting in the secondary side of the high-voltage transformer and attenuate the output from the control circuit. After the shorting is released, a time-constant circuit maintains an output state from the short detecting circuit to the control circuit for a prescribed period of time.

Thus, according to the present invention, the push-pull oscillation circuit is formed by the first and second switching elements, whereby the power of the output circuit can be sufficiently increased as compared with the conventional case. Even if the power of the output circuit is thus increased, increase in the overcurrent per unit time can be prevented in the shorted state of the load area. Namely, the time-constant circuit is adapted to provide a delay for re-starting of oscillation after the push-pull oscillation circuit stops oscillation by the shorting, thereby to elongate the time to subsequent shorting as compared with the conventional case. As the result, the overcurrent per unit time is decreased to reliably prevent danger of disconnection or fire.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
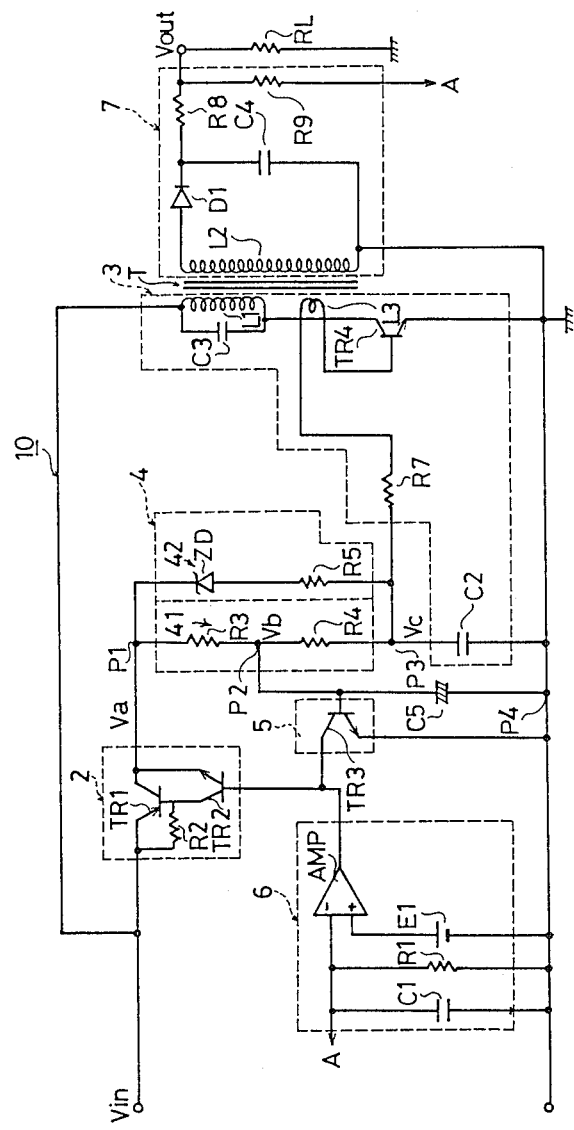
FIG. 1 is an electric circuit diagram of a conventional regulated high-voltage power supply circuit.
Figure 2:
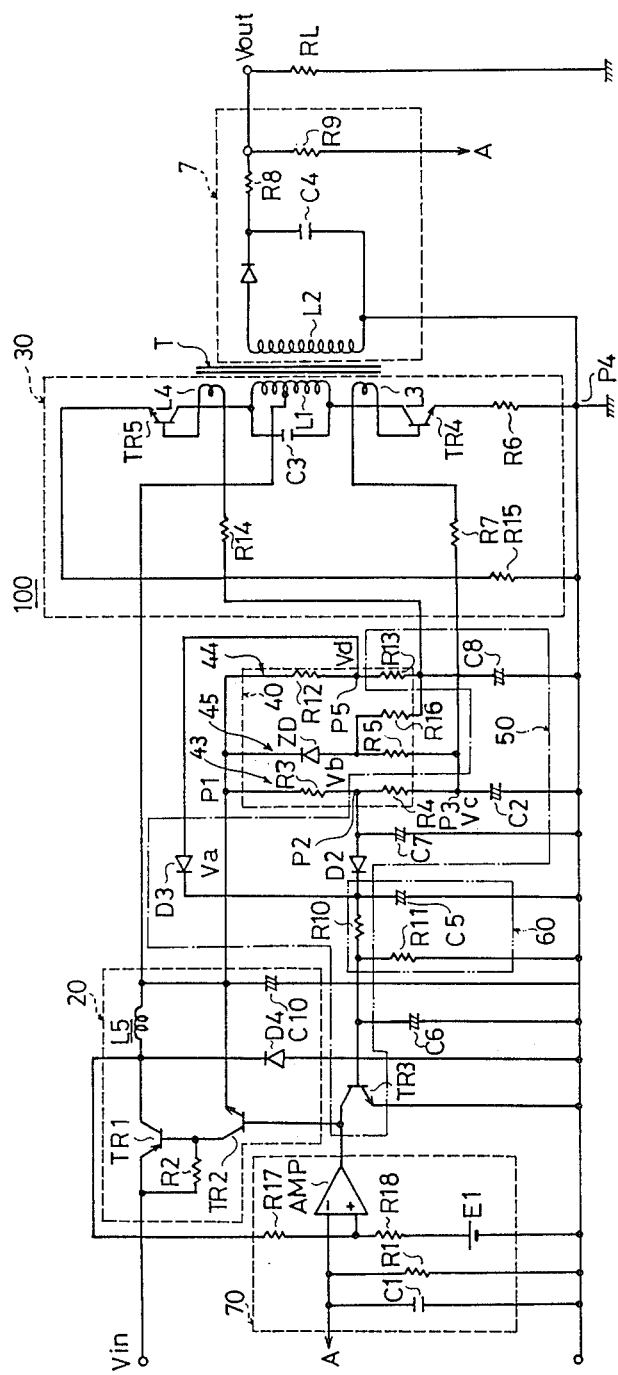
FIG. 2 is an electric circuit diagram of a regulated high-voltage power supply circuit according to an embodiment of the present invention.

FIG. 2 is an electric circuit diagram of a regulated high-voltage power supply circuit according to an embodiment of the present invention. Referring to FIG. 2, description is now made on the embodiment of the present invention, which is similar in structure to the conventional circuit as shown in FIG. 1 except for the following points: A regulated high-voltage power supply circuit 100 comprises a tuned-collector/grounded-emitter type push-pull oscillation circuit 30 having two oscillation transistors TR4 and TR5, a control circuit 20 for controlling voltage to be supplied to the oscillation circuit 30, a short detecting circuit 50 for detecting a shorted state of the secondary side of a high-voltage transformer T and outputting its detecting output to the control circuit 20 thereby to attenuate the output voltage of the control circuit 20 and a time-constant circuit 60 for maintaining the output state from the short detecting circuit 50 to the control circuit 20 for a prescribed period of time after the shorting is released.

The regulated high-voltage power supply circuit 100 further includes a resistance circuit 40 which supplies base currents to the oscillation transistors TR4 and TR5 in response to the output voltage from the control circuit 20. The control circuit 20 forms a chopper type circuit by transistors TR1 and TR2, a choke coil L5, a diode D4, a smoothing capacitor C10 and resistors R2, R17 and R18.

The push-pull oscillation circuit 30 is formed by a primary winding L1 of the high-voltage transformer T, a tuning capacitor C3 connected between both ends of the primary winding L1, first and second positive feedback windings L3 and L4 of the high-voltage transformer T, first and second oscillation transistors TR4 and TR5, first and second oscillation stabilizing resistors R7 and R14 and resistors R6 and R15. The first oscillation transistor TR4 has a collector connected to the other end of the primary winding L1, an emitter connected to a grounded point P4 through the resistor R6 and a base connected to an end of the first positive feedback winding L3. The other end of the first positive feedback winding L3 is connected to the first oscillation stabilizing resistor R7. The second oscillation transistor TR5 has a collector connected to one end of the primary winding L1, an emitter connected to the grounded point P4 and a base connected to an end of the second positive feedback winding L4. The other end of the second positive feedback winding L4 is connected to the second oscillation stabilizing resistor R14. The first and second positive feedback windings L3 and L4 are reverse to each other. A neutral point of the primary winding L1 is connected to the control circuit 20.

The resistance circuit 40 is formed by first and second resistance circuits parts 43 and 44 having high resistance values and a third resistance circuit part 45 having a low resistance value. The first resistance circuit part 43 is formed by a pair of series-connected resistors R3 and R4 and the second resistance circuit part 44 is formed by a pair of series-connected resistors R12 and R13, while the third resistance circuit part 45 is formed by connecting a zener diode ZD and resistors R5 and R16 in a series manner. The first, second and third resistance circuit parts 43, 44 and 45 are connected in parallel with each other.

The first resistance circuit part 43 is not mainly directed to supply a base current to the first oscillation transistor TR4, but is adapted to partially form the short detecting circuit 50 for detecting whether or not the high-voltage output from the output circuit 7 is shorted. Thus, the resistors R3 and R4 are set at high resistance values. This also applies to the second resistance circuit part 44.

On the other hand, the third resistance circuit part 45 is mainly adapted to form a main base current circuit for supplying the base currents to the oscillation transistors TR4 and TR5, and the resistors R5 and R16 are set at low resistance values respectively. An output terminal of the resistance circuit 40 is connected to the first and second oscillation stabilizing resistors R7 and R14 included in the push-pull oscillation circuit 30 and first and second regenerative capacitors C2 and C8 of the short detecting circuit 40.

The short detecting circuit 50 is formed by the resistors R4 and R13 of the resistance circuit 40, the first and second regenerative capacitors C2 and C8, a first delay capacitor C7, first and second reverse current preventing diodes D2 and D3, a resistor R10 and a protective transistor TR3. Meanwhile, the first delay capacitor C7 also serves as a smoothing capacitor. The first diode D2 has an anode connected to the junction P2 between the resistors R3 and R4 and a cathode connected to an end of the resistor R10, while the other end of the resistor R10 is connected to the base of the protective transistor TR3. The second diode D3 has an anode connected to the junction P5 between the resistors R12 and R13 and a cathode connected to the cathode of the first diode D2. The cathode of the second diode D3 may be directly connected to the base of the protective transistor TR3.

The time-constant circuit 60 is formed by a second delay capacitor C5 and resistors R10 and R11. The second delay capacitor C5 is connected between the cathode of the first diode D2 and the grounded point P4, and the resistor R11 is connected between the junction of the resistor R10 and the protective transistor TR3 and the grounded point P4. The second delay capacitor C5 is adapted to delay the time when the protective transistor TR3 enters a non-conducting state from a conducting state. The resistors R10 and R11 form a discharge path for the storage charge of the second delay capacitor C5. Other structure is similar to that of the conventional circuit as shown in FIG. 1, and hence redundant description is omitted.

Description is now made on the operation of the regulated high-voltage power supply circuit 100 as shown in FIG. 2. When the regulated high-voltage power supply circuit 100 is activated, the protective transistor TR3 temporarily conducts due to a voltage supplied through the second diode D3. However, oscillation becomes gradually large due to base current supplied from the first and second resistance circuit parts 43 and 44 and the first and second regenerative capacitors C2 and C8 are charged in the direction of negative potential, causing the potential at the junction P5 to be lowered. Consequently, the voltage supplied to the protective transistor TR3 through the second diode D3 is a value lower than the on voltage of the protective transistor TR3 and, in addition, the second delay capacitor C5 charged through the second diode D3 is discharged through the resistors R10 and R11. Accordingly, the protective transistor TR3 enters a non-conducting state in a short time. At the same time, the output voltage Va of the control circuit 20 rises to a value enabling the zener diode ZD to conduct. As the result, the base currents are supplied to the bases of the oscillation transistors TR4 and TR5, whereby the push-pull oscillation circuit 30 rapidly enters an oscillating state. When the push-pull oscillation circuit 30 thus enters a normal oscillating state, the base currents are continuously supplied to the oscillation transistors TR4 and TR5 similarly to the conventional case, while the protective transistor TR3 is not made to conduct.

If the cathode of the second diode D3 is connected to the protective transistor TR3 of the resistor R10, charge of the second delay capacitor C5 is delayed due to the existence of the resistor R10. Accordingly, if the voltage supplied to the protective transistor TR3 through the second diode D3 becomes a value lower than the on voltage of the protective transistor TR3, the protective transistor TR3 immediately enters a non-conducting state. Thus, the period for starting operation is decreased compared with the embodiment shown in FIG. 2.

In the push-pull oscillation circuit 30, the first and second oscillation transistors TR4 and TR5 mainly contribute to oscillation in positive and negative halfwaves of the AC waveform induced by the high-voltage transformer T respectively. Therefore, the power in the output circuit side of the high-voltage power supply circuit 100 can be sufficiently increased as compared with the conventional case.

When the high-voltage output of the output circuit 7 is shorted, the oscillation of the push-pull oscillation circuit 30 is so attenuated that voltage Vc at the junction P3 between the first regenerative capacitor C2 and the first oscillation stabilizing resistor R7 is increased in the conducting state of the first oscillation transistor TR4. Thus, operation voltage Vb at the junction P2 is also increased. As the result, a current flows to the first diode D2 of the short detecting circuit 50, whereby the protective transistor TR3 conducts to lower the output voltage Va of the control circuit 20.

In the conducting state of the second oscillation transistor TR5, voltage Ve at the junction R14 between the second regenerative capacitor C8 and the second oscillation stabilizing resistor R14 is increased, whereby the operation voltage Vd at the junction P5 is also increased. As the result, a current flows to the second diode D3 of the short detecting circuit 50, whereby the protective transistor TR3 conducts to attenuate the output voltage Va of the control circuit 20.

The attenuated output voltage Va is set to be lower than the zener voltage Vz of the zener diode ZD. Therefore, the zener diode ZD is made non-conducting and no base current is supplied to the oscillation transistors TR4 and TR5, whereby the push-pull oscillation circuit 3 stops the oscillation. Thus, the regulated high-voltage power supply circuit 100 is protected against shorting of the high-voltage output.

When the shorting of the high-voltage output is released, the push-pull oscillation circuit 3 starts fine oscillation by a fine base current flowing through the first and second resistance circuit parts 43 and 44, whereby the voltage Vc at the positive electrode of the first regenerative capacitor C2 starts lowering in the conducting state of the first oscillation transistor TR4. Thus, the potential at the junction P2 is also lowered and the first diode D2 is made non-conducting. Further, the voltage Ve at the positive electrode of the second regenerative capacitor C8 starts lowering in the conducting state of the second oscillation transistor TR5, whereby the potential at the junction P5 is lowered and the second diode D3 is made non-conducting.

In the time-constant circuit 60, however, discharge of the storage charge in the second delay capacitor C5 is delayed because of a discharge time constant determined by the second delay capacitor C5 and the discharge resistors R10 and R11 even if the potentials at the junctions P2 and P5 are lowered, whereby non-conduction of the discharge transistor TR3 is also delayed. In other words, the charge in the second delay capacitor C5 is continuously discharged through the discharge resistors R10 and R11 such that the protective transistor TR3 enters a non-conducting state only when the base potential thereof reaches a prescribed non-conducting level.

When the protective transistor TR3 thus enters a non-conducting state, the following operation is performed: The operation voltages Vb and Vd at the junctions P2 and P5 are slower in rise speed than the output voltage Va of the control circuit 20, and hence the protective transistor TR3 is not operated and the zener diode ZD is made to conduct. Consequently, the base currents are supplied to the oscillation transistors TR4 and TR5, whereby the push-pull oscillation circuit 30 smoothly starts normal oscillation.

This operation has the following advantages: Since the oscillation circuit 30 is of the push-pull type, the power of the output side of the regulated high-voltage power supply circuit 100 can be increased as compared with the conventional circuit, while the overcurrent per unit time in the shorted state of the load RL area is increased to cause danger. However, when the short detecting circuit 50 detects shorting in the load RL area to attenuate the output voltage from the control circuit 20, the push-pull oscillation circuit 30 stops oscillation to stop the high-voltage output, whereby the shorted state is released. Thus, the detecting operation of the short detecting circuit 50 is released. However, even if the detecting operation is released, the time-constant circuit 60 maintains the output state from the short detecting circuit 50 to the control circuit 20 for a prescribed period of time, whereby the oscillation stoppage state of the push-pull oscillation circuit 30 is not immediately released as in the conventional case. Namely, after the push-pull oscillation circuit 30 stops the oscillation by the shorting, a delay is provided for re-starting of the oscillation. Thus, the time to subsequent shorting is elongated as compared with the conventional case to reduce the overcurrent per unit time, thereby to reliably prevent danger of disconnection or fire.

Therefore, particularly when the regulated high-voltage power supply circuit 100 is applied to a copying machine or the like, a safety function of preventing paper burning and fire following thereto is effected even if an abnormal state is caused by spark discharge. Further, the regulated high-voltage power supply circuit 100 and peripheral circuits thereof can be prevented from breakage caused by spark discharge.

The detecting resistor R9 in the aforementioned embodiment may be replaced by a detecting coil, to provide a negative feedback control circuit of a magnetic feedback system. Further, the constant voltage power supply may be arbitrarily replaced by a constant current power supply or an AC high-voltage output power supply. In case where the time-constant circuit 60 in the aforementioned embodiment is located at a position appropriately separated from a portion subjected to inductance by the high-voltage transformer T etc., the bypass capacitor C6 may be omitted since no influence by magnetic inductance is exerted on the time-constant circuit 60. Further, the output circuit 7 may be formed by a multiplied voltage rectifying circuit or the rectifier diode D1 of the output circuit 7 may be connected in a direction reverse to that shown in FIG. 2. In such cases, the input terminal of the comparison amplifier AMP of the negative feedback control circuit 70 is connected in the opposite manner. In addition, the control circuit 20 is not restricted to the chopper type one provided in the aforementioned embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A regulated high-voltage power supply circuit comprising:
   a push-pull oscillation circuit formed by a primary winding coupled to a high-voltage transformer, a first positive feedback winding coupled to said high-voltage transformer, a first switching element having an end connected to said primary winding and a control terminal connected to said first positive feedback winding, a second positive feedback winding coupled to said high-voltage transformer in a state reverse to said first positive feedback winding and a second switching element having an end connected to said primary winding and a control terminal connected to said second positive feedback winding;
   a control circuit for controlling voltage to be supplied to said oscillation circuit;
   a short detecting circuit connected to said first positive feedback winding and said second positive feedback winding to detect shorting in the secondary side of said high-voltage transformer and supply its detecting output to said control circuit thereby to attenuate output voltage from said control circuit; and
   a time-constant circuit for maintaining an output state from said short detecting circuit to said control circuit for a prescribed period of time; wherein said short detecting circuit includes:
   a first regenerative capacitor connected between said first positive feedback winding and a reference potential to be charged in response to shorting in the secondary side of said high-voltage transformer,
   a second regenerative capacitor connected between said second positive feedback winding and a reference potential to be charged in response to shorting in said secondary side of said high-voltage transformer,
   diodes for composing charges of said first and second regenerative capacitors, and
   a switching element receiving said charges of said first and second regenerative capacitors through said diodes to perform switching in response to said charges thereby to attenuate said output voltage from said control circuit,
   said time-constant circuit being connected between said first and second regenerative capacitors and said switching element.

2. A regulated high-voltage power supply circuit in accordance with claim 1, wherein said time-constant circuit includes:
   a delay capacitor connected between the output sides of said diodes and said reference potential, and
   discharge resistors for discharging the charge of said delay capacitor.

3. A regulated high-voltage power supply circuit in accordance with claim 1, further including a resistance circuit for supplying currents to said first and second switching elements included in said oscillation circuit in response to an output signal from said control circuit.

4. A regulated high-voltage power supply circuit in accordance with claim 3, wherein said resistance circuit includes:
   a first resistance circuit and a second resistance circuit formed by a plurality of series-connected resistors having high resistance values respectively, and
   a third resistance circuit including a zener diode, said third resistance circuit being connected in parallel with said first resistance circuit and said second resistance circuit.

* * * * *

UNITED STATES PATENT AND TRADEMARK OFFICE
CERTIFICATE OF CORRECTION

PATENT NO. : 4,755,923
DATED : July 5, 1988
INVENTOR(S) : Maeba et al.

It is certified that error appears in the above-identified patent and that said Letters Patent is hereby corrected as shown below:

Title page:

Please correct the name of the assignee as follows:

Change "Fukami Patent Office" to --Murata Manufacturing Co., Ltd.--.

Signed and Sealed this

Thirteenth Day of December, 1988

Attest:

DONALD J. QUIGG

*Attesting Officer*         *Commissioner of Patents and Trademarks*